(12) United States Patent
Ye et al.

(10) Patent No.: US 11,150,543 B2
(45) Date of Patent: Oct. 19, 2021

(54) TRANSPARENT COVER AND IMAGING OPTICAL SYSTEM

(71) Applicant: Hangzhou Hikvision Digital Technology Co., Ltd., Zhejiang (CN)

(72) Inventors: Zhan Ye, Zhejiang (CN); Yang Li, Zhejiang (CN); Youhui Xu, Zhejiang (CN); Yao Liu, Zhejiang (CN); Caisheng Yan, Zhejiang (CN); Peng Xu, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/963,665

(22) PCT Filed: May 25, 2018

(86) PCT No.: PCT/CN2018/088444
§ 371 (c)(1),
(2) Date: Jul. 21, 2020

(87) PCT Pub. No.: WO2019/140820
PCT Pub. Date: Jul. 25, 2019

(65) Prior Publication Data
US 2021/0072625 A1    Mar. 11, 2021

(30) Foreign Application Priority Data

Jan. 22, 2018 (CN) .......................... 201810059798.5
Jan. 22, 2018 (CN) .......................... 201820101747.X

(51) Int. Cl.
*G03B 17/56* (2021.01)
*H04N 5/225* (2006.01)

(52) U.S. Cl.
CPC ......... *G03B 17/561* (2013.01); *H04N 5/2252* (2013.01); *H04N 5/2253* (2013.01)

(58) Field of Classification Search
None
See application file for complete search history.

(56) References Cited

U.S. PATENT DOCUMENTS

| 2005/0025360 A1 | 2/2005 | Gin |
| 2006/0177217 A1 | 8/2006 | Opmeer |

(Continued)

FOREIGN PATENT DOCUMENTS

| CN | 1866121 A | 11/2006 |
| CN | 204392696 U | 6/2015 |

(Continued)

*Primary Examiner* — William B Perkey
(74) *Attorney, Agent, or Firm* — Bret E. Field; Bozicevic, Field & Francis LLP

(57) ABSTRACT

A transparent cover of an optical camera system comprises a curved sidewall portion having an outer contour formed by the rotation of a preset continuous curve. The preset continuous curve comprises a first curve segment and a second curve segment, each having a curvature no more than a first preset value, wherein the first back focus offset of a curved surface corresponding to the first curve segment does not exceed the second preset value, and a second back focus offset of a curved surface corresponding to the second curve segment does not exceed a third preset value. A first line segment is formed by connecting an end point of the preset continuous curve with a center of a circle circumscribing edges of a camera, and an included angle between the first line segment and a boundary line between the first and second curve segments is greater than 0.

18 Claims, 8 Drawing Sheets

(56) References Cited

U.S. PATENT DOCUMENTS

| | | | |
|---|---|---|---|
| 2013/0100292 A1 | 4/2013 | Mojaver | |
| 2015/0358538 A1* | 12/2015 | Donaldson | G03B 17/55 348/38 |
| 2017/0139309 A1* | 5/2017 | Axelsson | G03B 17/561 |
| 2018/0020135 A1 | 1/2018 | Aoi et al. | |
| 2018/0165932 A1* | 6/2018 | Larsson | G03B 17/12 |
| 2019/0191059 A1* | 6/2019 | Park | H04N 7/181 |
| 2019/0297231 A1* | 9/2019 | Song | G08G 1/142 |
| 2019/0324352 A1* | 10/2019 | Shin | G02B 7/02 |
| 2019/0327398 A1* | 10/2019 | Shin | G08B 13/19632 |
| 2020/0366820 A1* | 11/2020 | Yan | G03B 17/12 |
| 2020/0389603 A1* | 12/2020 | Li | G03B 17/561 |
| 2021/0072486 A1* | 3/2021 | Li | G03B 17/02 |
| 2021/0072625 A1* | 3/2021 | Ye | G03B 17/561 |
| 2021/0092265 A1* | 3/2021 | Li | G03B 17/561 |

FOREIGN PATENT DOCUMENTS

| | | |
|---|---|---|
| CN | 104754198 A | 7/2015 |
| CN | 204465703 U | 7/2015 |
| CN | 204993575 U | 1/2016 |
| CN | 105873383 A | 8/2016 |
| CN | 106713841 A | 5/2017 |
| CN | 206743362 U | 12/2017 |
| CN | 207833204 U | 9/2018 |
| EP | 3168819 A1 | 5/2017 |
| JP | 2005300659 A | 10/2005 |
| JP | 2014-232283 A | 12/2014 |
| JP | 6189643 B2 | 8/2017 |

* cited by examiner

TRANSPARENT COVER AND IMAGING OPTICAL SYSTEM

The present application claims the priority to a Chinese patent application No. 201820101747.X filed with the China National Intellectual Property Administration on Jan. 22, 2018 and entitled "transparent cover of camera and imaging optical system having the same", and claims the priority to a Chinese patent application No. 201810059798.5 filed with the China National Intellectual Property Administration on Jan. 22, 2018 and entitled "transparent cover and imaging optical system having the same", which are incorporated herein by reference in their entireties.

TECHNICAL FIELD

The present application relates to the technical field of cameras, in particular to a transparent cover and an imaging optical system.

BACKGROUND

The imaging optical system includes a camera and a transparent cover covered outside the camera. Light beams enter the camera lens and are projected on the image plane of the image sensor of the camera. During the monitoring process, the camera needs to pan and/or tilt to obtain images or video data with a larger monitoring range.

The transparent cover is mainly used to protect the camera. In order to monitor in a larger range, the protective area of the transparent cover over the camera is also set to be correspondingly larger, usually to be over-hemispherical in shape (greater than half a sphere, such as three quarters or five sixths of a complete sphere).

The camera lens has a fixed range of field angle. In order to obtain a clear image on the image plane of the image sensor, the range of the field angle of the camera lens is set to be relatively small due to the limitation of the production process of the transparent cover, which thus fails to meet the demand for a large monitoring range.

SUMMARY

The embodiments of the present application provide a transparent cover and an imaging optical system so as to enable a camera lens to meet the requirement of a large monitoring range.

In a first aspect, an embodiment of the present application provides a transparent cover, including:

a curved sidewall portion (520), which has an outer contour formed by a preset continuous curve rotating around a longitudinal centerline L;

wherein the preset continuous curve includes a first curve segment (521) and a second curve segment (522), each having a curvature no more than a first preset value; a first back focus offset of a curved surface corresponding to the first curve segment (521) is no more than a second preset value, and a second back focus offset of a curved surface corresponding to the second curve segment (522) is no more than a third preset value;

a first line segment (NQ) is formed by connecting an endpoint (N) of the preset continuous curve, situated outside, with a center (Q) of a circle (320) circumscribing edges of a camera lens; an included angle between the first line segment (NQ) and a boundary line (QI) of the first curve segment (521) and the second curve segment (522) is greater than 0°.

In a second aspect, an embodiment of the present application provides an imaging optical system, including:

a main casing assembly (400), a transparent cover (500), a camera (300) and a camera regulator, wherein, wherein the transparent cover (500) is mounted on the main casing assembly (400), and includes a curved sidewall portion (520), which has an outer contour formed by a preset continuous curve rotating around a longitudinal centerline L; the preset continuous curve includes a first curve segment (521) and a second curve segment (522), each having a curvature no more than a first preset value; a first back focus offset of a curved surface corresponding to the first curve segment (521) is no more than a second preset value, and a second back focus offset of a curved surface corresponding to the second curve segment (522) is no more than a third preset value; a first line segment (NQ) is formed by connecting an endpoint (N) of the preset continuous curve, situated outside, with a center (Q) of a circle (320) circumscribing edges of a camera lens; an included angle between the first line segment (NQ) and a boundary line (QI) of the first curve segment (521) and the second curve segment (522) is greater than 0°;

the camera regulator is mounted within a space formed by the transparent cover (500) and the main casing assembly (400), and the camera is movably disposed on the camera regulator.

In the embodiment of the present application, it is provided that the curvatures of the first curve segment and the second curve segment of the transparent cover are no more than the first preset value, the first back focus offset of the first curve segment is no more than the second preset value and the second back focus offset of the second curve segment is no more than the third preset value. In this way, the aberrations of the optical systems formed respectively by the first curve segment and the second curve segment on the image sensor are controlled within an allowable range to ensure that the images obtained by the image sensor are complete and clear.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application. Those skilled in the art can also obtain other drawings based on these drawings without any creative efforts.

Figure 1:
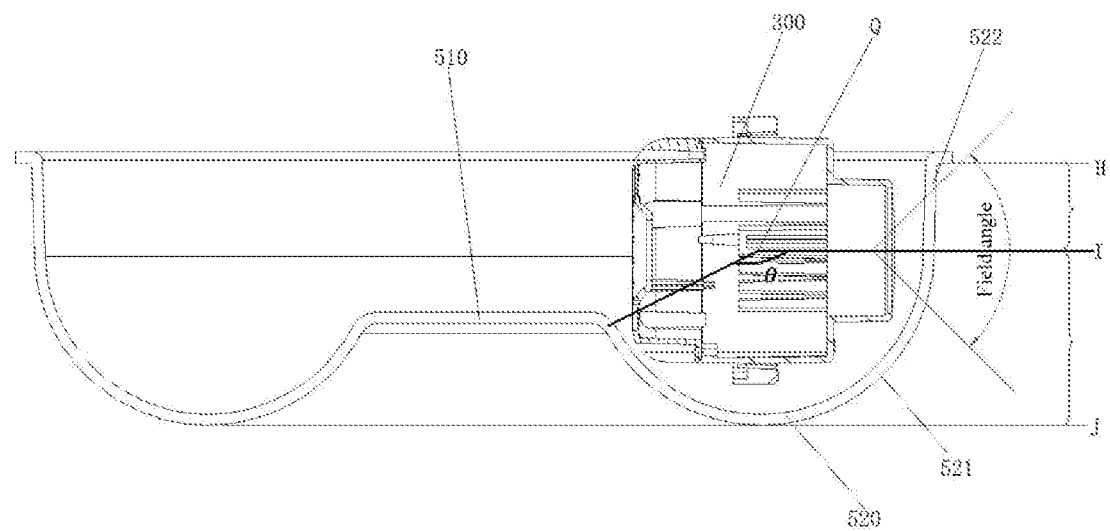
FIG. 1 is a schematic structural diagram of a transparent cover according to an embodiment of the present application.

| Reference numerals: | | | |
|---|---|---|---|
| 100 | fixing disc | 110 | first tooth slots |
| 120 | avoidance hole | 200 | camera bracket |
| 210 | first bracket | 211 | elastic connection portion |
| 211a | first meshing teeth | 212 | connection base |
| 212a | first tightening protrusion | 212b | second elastic arm |
| 213 | first catch | 214 | support arm |
| 214a | second tightening protrusion | 214b | first limitation portion |
| 214c | support arm body | 214d | fixing block |
| 214e | screw | 220 | second bracket |
| 221 | tightening disc | 221a | tightening grooves |
| 221b | second limitation portion | 222 | annular structural member |
| 222a | second meshing teeth | 222b | second catch |
| 222c | boss | 222d | third limitation portion |
| 300 | camera | 310 | second tooth slots |
| 320 | fourth limitation portion | 400 | main casing assembly |
| 500 | transparent cover | 510 | flat portion |
| 520 | curved sidewall portion | 530 | curved surface portion |
| 521 | first curve segment | 522 | second curve segment |
| A | transition segment between the first curve segment and the second curve segment in the present application | B | traditional transition segment between the first curve segment and the second curve segment |

DETAILED DESCRIPTION

In order to make the objectives, technical solutions and advantages of the present application clearer, the present application will be described clearly and completely below with reference to the drawings and embodiments. Obviously, the described embodiments are merely a part of rather than all of the embodiments of the present application. All other embodiments obtained by those skilled in the art based on the embodiments of the present application without any creative effort fall within the scope of protection of the present application.

In the drawings, identical or similar reference numerals refer to identical or similar or functionally identical or similar elements.

The orientations or positional relationships, indicated by the terms "center", "longitudinal", "transverse", "front", "rear", "left", "right", "vertical", "horizontal", "top", "bottom", "inner", "outer" and the like, are based on those as shown in the drawings and shouldn't be understood as a limitation to the protection scope of the embodiments of the present application, which are merely for the convenience of describing the embodiments of the present application and simplifying the description, rather than indicating or implying that the referenced devices or elements must have a specific direction, or be constructed and operated in a specific orientation.

Figure 5:
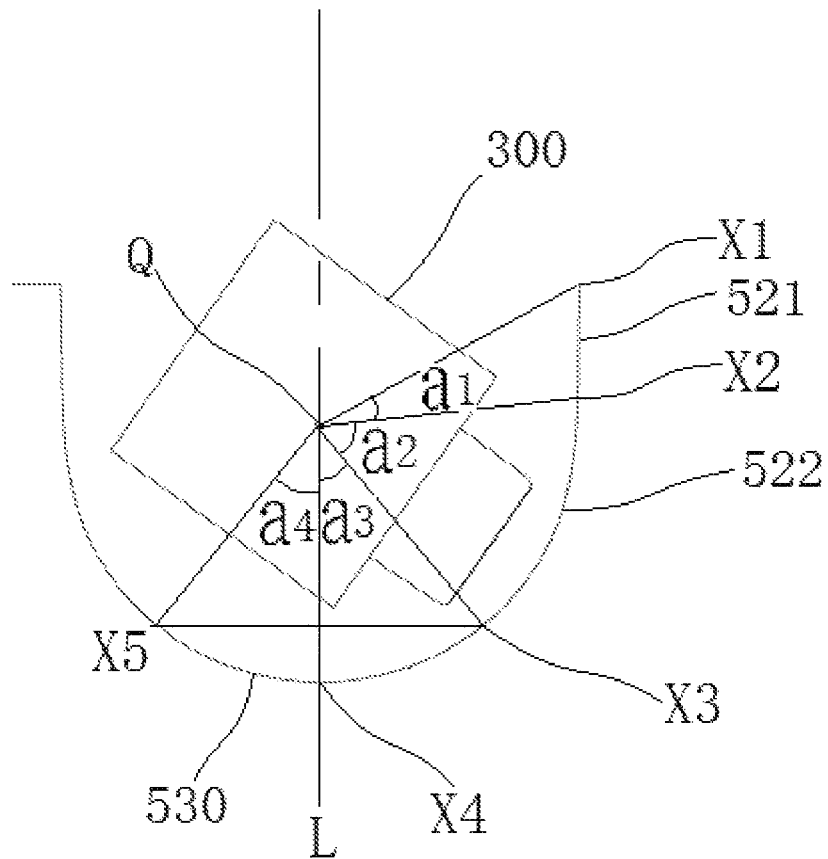
FIG. 5 is a schematic structural diagram of a transparent cover according to another embodiment of the present application.
Figure 6:
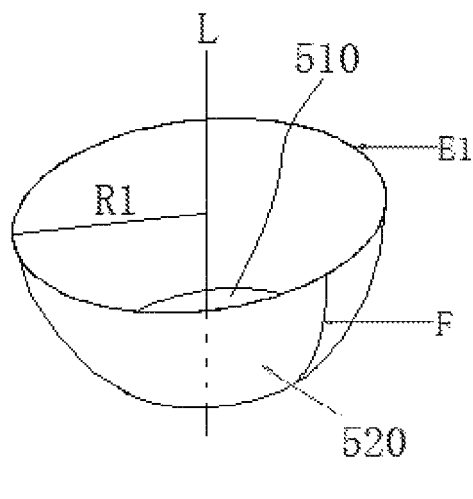
FIG. 6 is a schematic structural diagram of a transparent cover according to another embodiment of the present application.
Figure 7:
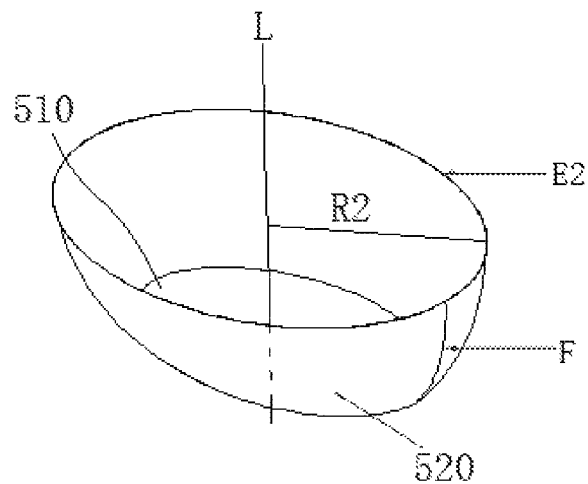
FIG. 7 is a schematic structural diagram of a transparent cover according to still another embodiment of the present application.

As shown in FIGS. 1-7, the transparent cover provided by the embodiment of the present application includes a curved sidewall portion 520, which has an outer contour formed by rotating a preset continuous curve around the longitudinal centerline L. The "formed by rotating a preset continuous curve around the longitudinal centerline L" here may mean that the curved sidewall portion 520 with a circular cross section is obtained by rotating the preset continuous curve shown in FIG. 6 with a fixed radius R1, or may mean that the curved sidewall portion 520 with a circular cross section is obtained by rotating the preset continuous curve shown in FIG. 2 with a fixed radius R3, or may mean that the curved sidewall portion 520 with an elliptical cross section is obtained by rotating a preset continuous curve with a variable radius R2, as shown in FIG. 7.

The preset continuous curve has an endpoint M situated inside and an endpoint N situated outside. "Inside" and "outside" are relative to the structure as a whole, the direction away from the transparent cover 500 is facing the "outside", and the opposite direction is facing the "inside". A first line segment NQ is formed by connecting the end point N of the preset continuous curve with the center Q of the circle 320 circumscribing the edges of a camera, and a second line segment MQ is formed by connecting the end point M of the preset continuous curve with the center Q of the circle 320 circumscribing the edges of a camera. The included angle β between the first line segment NQ and the second line segment MQ is greater than 180° and is disposed facing toward the preset continuous curve.

The preset continuous curve includes a first curve segment 521 and a second curve segment 522. The curvature of the first curve segment is different from that of the second curve segment. The actual imaging condition is illustrated by way of example below.

Taking FIG. 1 as an example, the first curve segment 521 is located within the range of angle θ shown in FIG. 1, i.e., between the straight line I and the straight line J, and the second curve segment 522 is located between the straight line H and the straight line I. The first and second curve segments are covered by the view angle of the lens of the camera 300 when said lens is located almost horizontal, e.g., when said lens is aligned with the boundary line (straight line I) between the first curve segment 521 and the second curve segment 522. In this embodiment, the included angle between the first line segment NQ and the boundary line QI between the first curve segment 521 and the second curve segment 522 is greater than 0°. It is provided that the curvatures of the first curve segment 521 and the second curve segment 522 are no more than a first preset value, the first back focus offset Δf1 of the curved surface corresponding to the first curve segment 521 is no more than a second preset value, and the second back focus offset Δf2 of the curved surface corresponding to the second curve segment 522 is no more than a third preset value.

In the present embodiment, by setting the curvatures of the first curve segment 521 and the second curve segment 522 of the transparent cover no more than the first preset value, such that the first back focus offset of the curved surface corresponding to the first curve segment 521 is no more than the second preset value and the second back focus offset of the curved surface corresponding to the second curve segment 522 is no more than the third preset value. (i.e., by limiting the curvature changes of the first curve segment 521 and the second curve segment 522 so as to control the aberrations of the optical systems formed respectively by the first curve segment 521 and the second curve segment 522 on an image sensor to be within an allowable range), it is ensured that images obtained by the image sensor are complete and clear.

Figure 2:
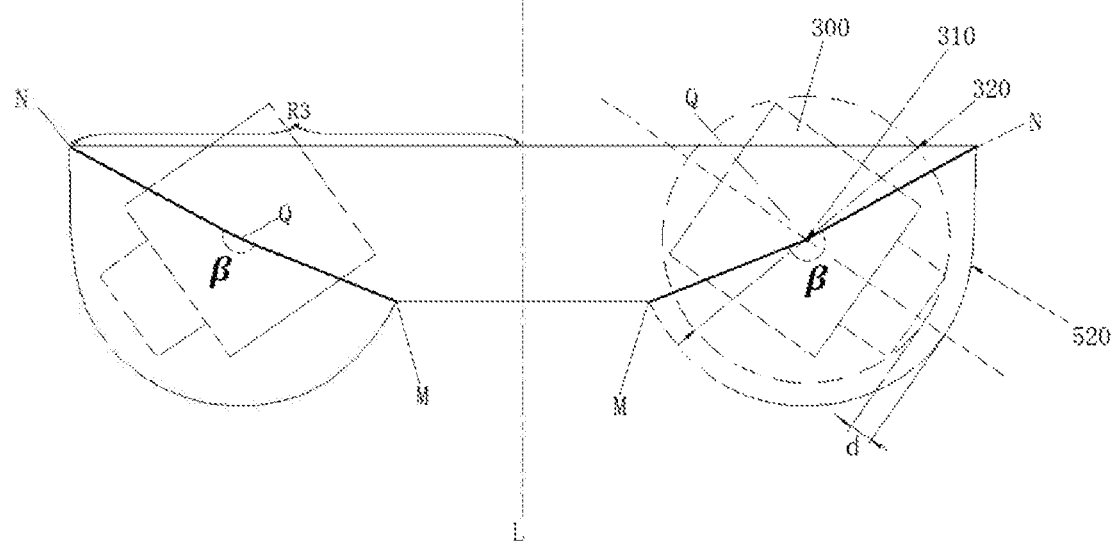
FIG. 2 is a schematic structural diagram of a transparent cover according to an embodiment of the present application, which shows a circle circumscribing edges of a camera formed by the rotation of the camera.

In one embodiment, the preset continuous curves on both sides of the longitudinal centerline L are symmetrical to each other. As shown in FIGS. 2 and 5, the preset continuous curves on the left and right sides of the longitudinal centerline L are symmetrical relative to the longitudinal centerline L. "Left" and "right" can be understood as corresponding "left" and "right" in the plane of the paper, respectively.

The preset continuous curve is formed by a spline curve. "Spline curve" is a non-uniform rational B-spline curve (NURBS), a smooth curve passing through a series of given points in the computer aided design, which not only passes through each ordered data point, but also is provided with continuous first and second derivatives at each data point. That is to say, the curve has the characteristics of being continuous and uniform variation of its curvature. In the present embodiment, the curved sidewall portion 520 with a preset curvature can be obtained by limiting the curvature of the spline curve, so as to ensure a smooth transition of the curvature of the curved sidewall portion 520 at a turning point.

In one embodiment, as shown in FIG. 5, the transparent cover further includes a curved surface portion 530 enclosed at one end of the curved sidewall portion 520, and the longitudinal sectional curve of the transparent cover formed by the curved surface portion 530 and the curved sidewall portion 520 is substantially over-semicircular in shape. In FIG. 5, the preset continuous curve is the curve segment where point X3, point X4 and point X5 are located. Wherein the curve segment between the point X3 and point X2 represents the first curve segment 521, with the angle corresponding to its curvature referenced as a1. The curve segment between the point X1 and point X2 represents the second curve segment 522, with the angle corresponding to its curvature referenced as a2. The curve segment where the point X3, the point X4 and the point X5 are located is the longitudinal sectional curve of the curved surface portion 530, with the angle corresponding to its curvature referenced as the sum of a3 and a4.

The length of the first curve segment 521 along the longitudinal centerline L is greater than the length of the second curve segment 522 along the longitudinal centerline L. The center of a full circle where the longitudinal sectional curve of the transparent cover is located is disposed closely adjacent to the center Q. The transparent cover can accommodate a camera 300. In this case, when the camera 300 performs a tilting movement around a rotation axis 310 thereon, the camera 300 substantially rotates within the area covered by the curved sidewall portion 520 and limited by the rotation axis 310.

Figure 3:
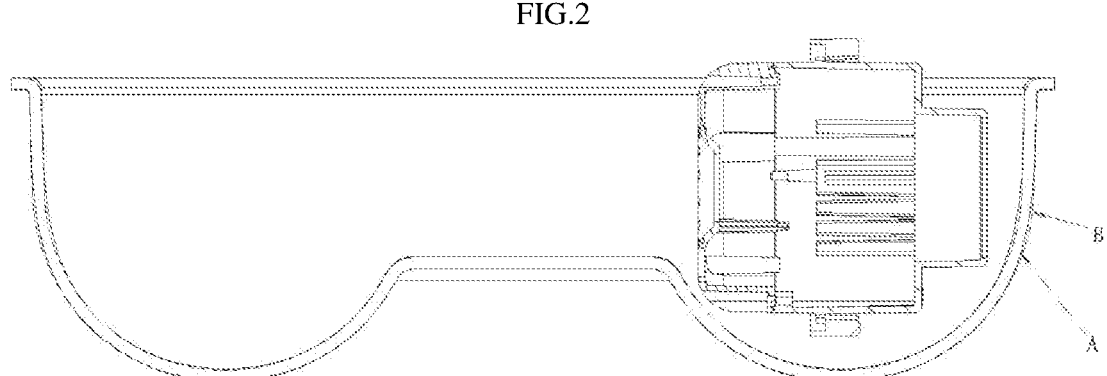
FIG. 3 is a schematic structural diagram of a transparent cover according to an embodiment of the present application, which shows the difference in the shape of a transition segment between a first curve segment and a second curve segment.
Figure 4:
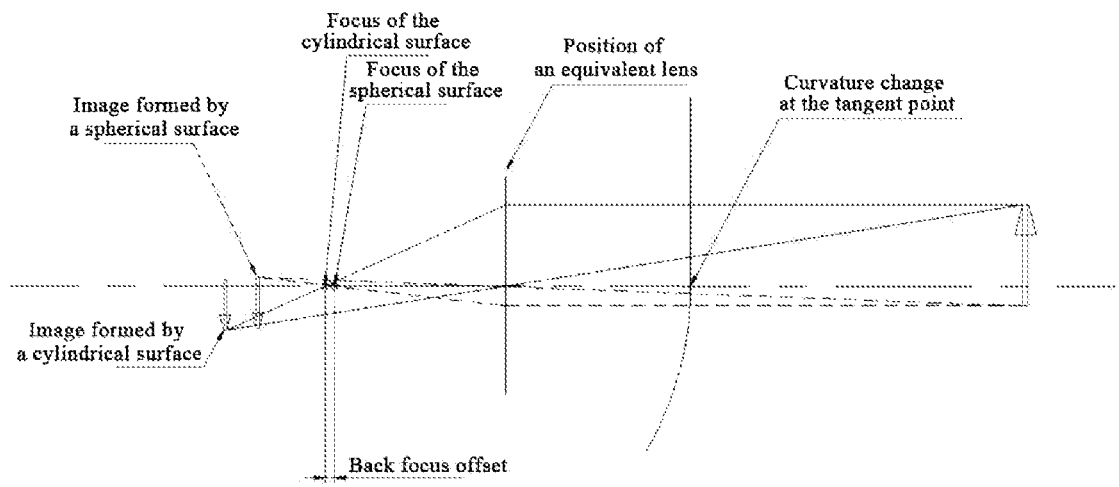
FIG. 4 is a schematic diagram of forming back focus offsets of a first curve segment and a second curve segment of a transparent cover according to an embodiment of the present application.

As shown in FIGS. 1 to 3, the transparent cover further includes a flat portion 510 that is enclosed at one end of the curved sidewall portion 520 and is disposed adjacent to the first curve segment 521. The length of the first curve segment 521 along the longitudinal centerline L is greater than the length of the second curve segment 522 along the longitudinal centerline L, and the enclosed end is configured to be planar. The first curve segment 521 protrudes outward from the enclosed end along the direction of the longitudinal centerline L, and the preset continuous curve is substantially over-semicircular in shape. The transparent cover can accommodate a plurality of cameras 300 circumferentially spaced around the longitudinal centerline L thereof (as shown in FIG. 2). In this case, when each camera 300 performs a tilting movement around the rotation axis 310 thereon, the camera 300 substantially rotates within the area covered by the curved sidewall portion 520 and limited by the rotation axis 310. "Upper" and "lower" may be understood as corresponding "upper" and "lower" in the plane of the paper, respectively. The "rotation axis 310" is perpendicular to the plane of the paper.

In addition to the above two cases, the longitudinal sectional curve of the curved sidewall portion 520 is substantially over-semicircular in shape as shown in FIGS. 6 and 7, and the flat portion 510 is enclosed by the curved sidewall portion 520. This shape differs from the shape of the transparent cover shown in FIG. 5 in that the first curve segment 521 does not protrude outward from the enclosed end along the direction of the longitudinal centerline L. The longitudinal sectional curve of the curved sidewall portion 520 may also have other shapes, as long as the curvatures of the first curve segment 521 and the second curve segment 522 of the transparent cover are no more than the first preset value, such that the first back focus offset of the first curve segment 521 is no more than the second preset value, and the second back focus offset of the second curve segment 522 is no more than the third preset value.

"Over-semicircular" may be a part of a complete circle, greater than one-half, such as two-thirds of a complete circle, three-quarters of a complete circle, or five-sixths of a complete circle. The above "substantially over-semicircular" can be understood as being close to over-semicircular in shape rather than being a part of a standard circle, because it is impossible to make the longitudinal sectional curve of the curved sidewall portion 520 of the transparent cover into a standard over-semicircular shape due to the limitation of the molding process thereof.

In one embodiment, since the longitudinal sectional curve F on the left or right side of the longitudinal centerline L is formed by a spline curve, i.e., the longitudinal sectional curve F can sweep along a specific trajectory of a normal plane so as to form a curved surface. When the trajectory along which the spline curve rotates circumferentially is circular, a curved surface E1 (as shown in FIG. 6) is formed. When the trajectory along which the spline curve rotates circumferentially is elliptical, a curved surface E2 (as shown in FIG. 7) is formed. Actually, due to the limitation of the production process of the transparent cover, the transverse sectional curve mentioned in this embodiment that is circular E1 or elliptical E1 is merely approximate to rather than being a standard circular or standard elliptical in shape.

In one embodiment, the range of curvature change of the transparent cover is set as follows. The imaging optical system may include three parts, i.e., the transparent cover, the camera, and the image sensor. A clear image is an image where the aberration of each pixel is within an allowable range. Since the image processing capability, the image sensor used and the camera used are often provided in advance, the setting of the curvature change range of the transparent cover should be matched with the preset parameter factors of the image sensor and the camera used. More particularly, in a zoom camera, the change in focal length has the greatest impact on the resolution of the image sensor, so images with long focal lengths are firstly considered during the setting of the curvature change range. Secondly, the angle of view becomes the largest at a wide angle, and the change of curvature of the transparent cover within this range should meet the imaging requirements under wide angles.

As mentioned above, the allowable aberrations are different with different resolution methods and for different cameras, different image sensors, so the allowable curvature change of the transparent cover set in different situations is also different. It is known from multiple sets of experimental data that the first preset value that enables to obtain a clear image is 0.1. That is to say, the curvatures of the first curve segment 521 and the second curve segment 522 are set no more than 0.1, preferably 0.03. Of course, the resolution methods, cameras and image sensors can be conversely derived based on a transparent cover with a specific curvature change.

In one embodiment, by setting the curvature of the first curve segment and the curvature of the second curve segment, the second preset value of the first back focus offset of the curved surface corresponding to the first curve segment 521 is controlled as 0.06, and the third preset value of the second back focus offset of the curved surface corresponding to the second curve segment 522 is controlled as 0.015. In this way, the aberrations of the optical systems formed respectively by the first curve segment 521 and the second curve segment 522 on an image sensor are ensured to be controlled within an allowable range, ensuring that the images obtained by the image sensor are complete and clear.

Figure 8:
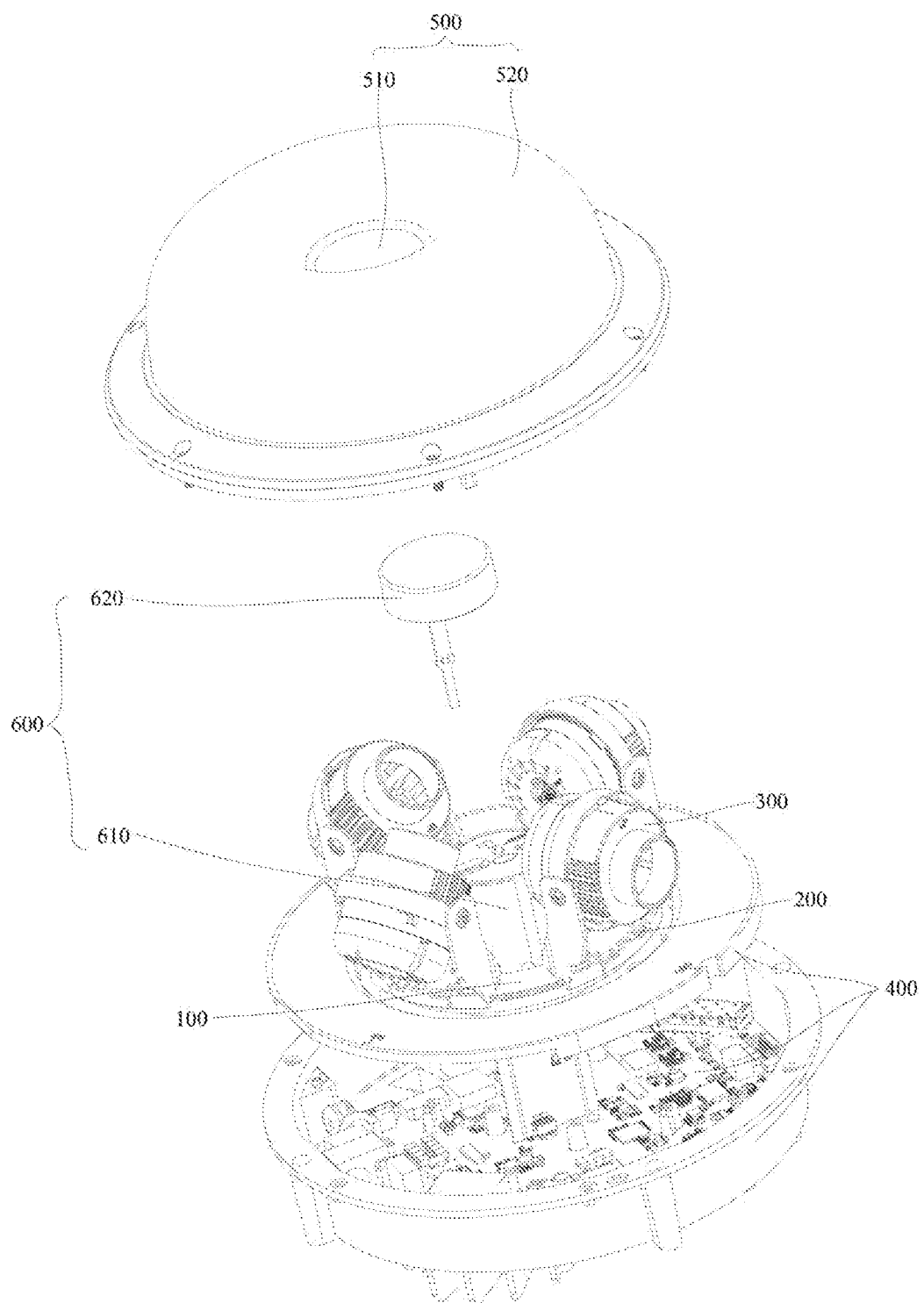
FIG. 8 is an exploded schematic structural diagram of an imaging optical system according to an embodiment of the present application.
Figure 9:
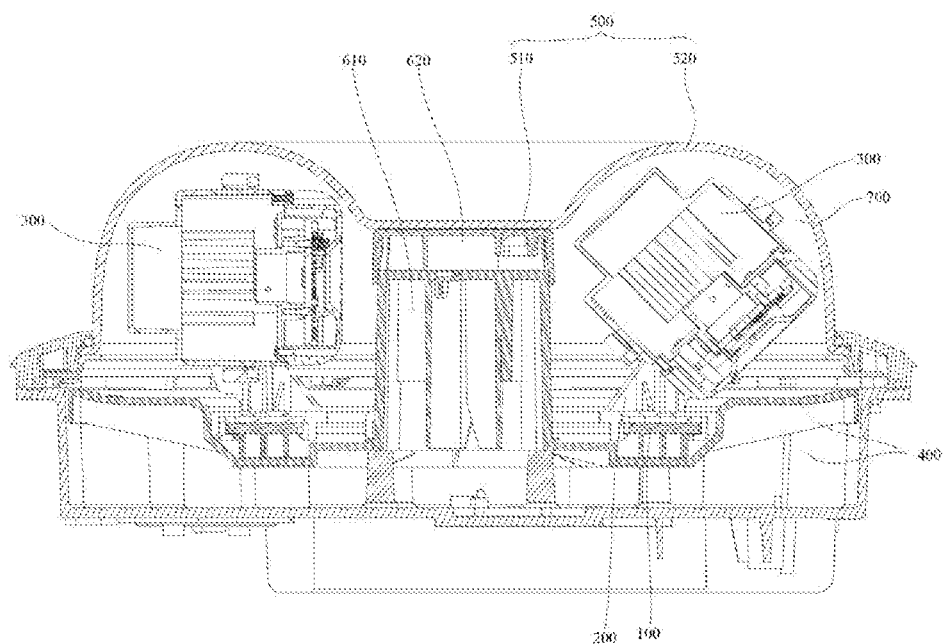
FIG. 9 is a cross-sectional view of an imaging optical system according to an embodiment of the present application.
Figure 10:
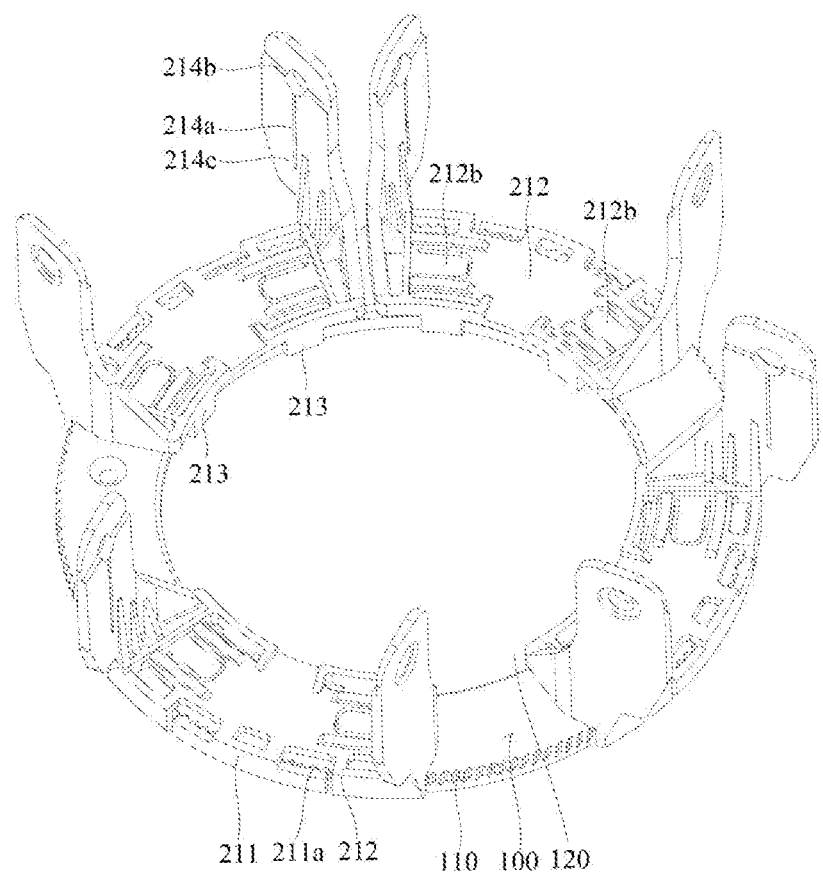
FIG. 10 is a partial structural diagram of a camera regulator according to an embodiment of the present application.
Figure 11:
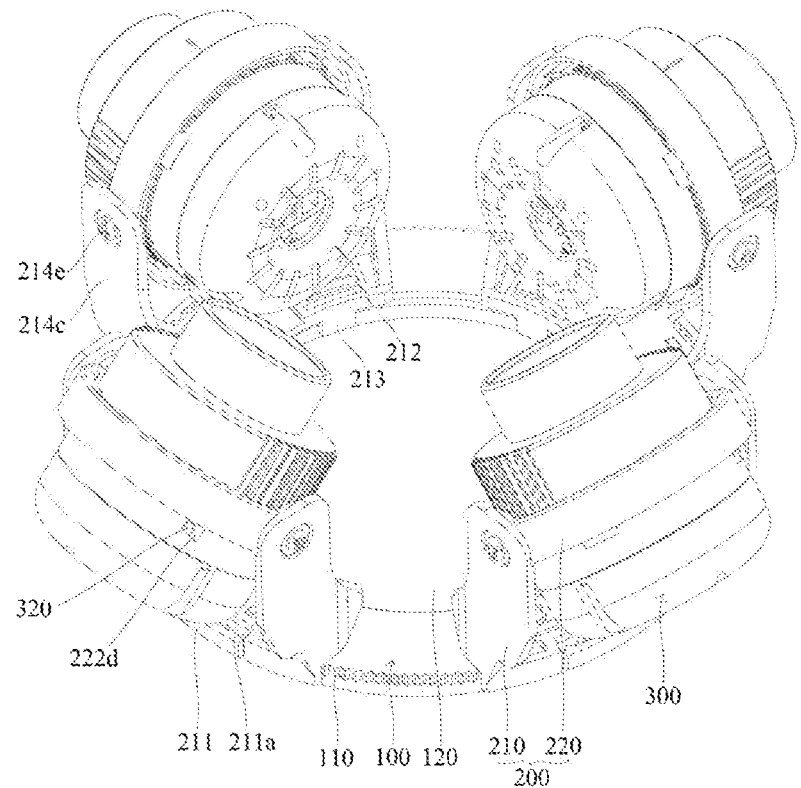
FIG. 11 is a schematic structural diagram of a camera regulator mounted with a camera according to an embodiment of the present application.

As shown in FIG. 8, an embodiment of the present application discloses an imaging optical system, including a camera regulator, a main casing assembly 400, a transparent cover 500, and a camera 300.

The main casing assembly 400 usually includes a plurality of components, and provides a mounting base or a receiving space for other components of the imaging optical system.

The transparent cover 500 is mounted on the main casing assembly 400, and the camera regulator is mounted within a space formed by the transparent cover 500 and the main casing assembly 400. The transparent cover 500 is usually fixed on the main casing assembly 400 in a fixed manner.

The structure of the transparent cover 500 is described in the above embodiment and will not be described in detail below.

In one embodiment, the distance d along the optical axis of the camera 300 between the curved sidewall portion 520 and the circle 320 circumscribing the edges of the camera and formed by the rotation of the camera 300 is set to vary within a first preset range. By controlling the value of the distance d, the aberrations of the optical systems formed respectively by the first curve segment 521 and the second curve segment 522 on the image sensor are ensured to be controlled within an allowable range, ensuring that the images obtained by the image sensor are complete and clear.

From the appearance, the transparent cover with a changing curvature in the present application can meet the shape requirements of the transparent cover of the camera, which is substantially consistent with the shape of a traditional transparent cover combining a regular spherical surface and a cylindrical surface in shape. FIG. 3 shows that the transitional line segment between the curved surface corresponding to the first curve segment 521 and the curved surface corresponding to the second curve segment 522 of this application is a solid line B, and the traditional line segment between the curved surface corresponding to the first curve segment 521 and the curved surface corresponding to the second curve segment 522 is a dashed line A. The distance between the curved surface of the traditional regular spherical transparent cover and the image plane of the image sensor in the direction of the optical axis of the camera remains unchanged. The distance d between the circle 320 circumscribing the edges of the camera and formed by the rotation of the camera 300 in the present application, and the curved sidewall portion 520 on the optical axis of the camera 300 may vary within a range from 2 to 3 mm, as long as the back focus offsets of the curved surface corresponding to the first curve segment 521 and the curved surface corresponding to the second curve segment 522 meet the setting requirements in the above embodiments, and the protective effect of the curved sidewall portion 520 on the camera 300 is ensured at the same time.

As shown in FIGS. 8 to 15, the disclosed camera regulator includes a fixing disc 100 and at least two camera brackets 200. The fixing disc 100 is included in a main body of the imaging optical system and provides a mounting base for the camera brackets 200 as well as the camera 300 provided on the fixing disc 100 through the camera brackets 200.

The camera bracket 200 includes a first bracket 210 on which a camera 300 is mounted. The camera is located within a space covered by the curved sidewall portion 520. The first bracket 210 is movably disposed on the fixing disc 100, and is thus movable relative to the fixing disc 100, generally movable in the circumferential direction of the fixing disc 100. The movement of the first bracket 210 drives the camera 300 to move therewith, thereby adjusting the position of the camera 300 on the fixing disc 100, and finally realizing the P-direction adjustment of the camera 300, so that the camera 300 is moved in a plane parallel to the fixing disc 100.

In the imaging optical system disclosed in the embodiments of the present application, the transparent cover 500 is mounted on the main casing assembly 400, and includes a flat portion 510 and a curved sidewall portion 520 surrounding the flat portion 510. Further, the camera 300 is mounted within a space covered by the curved sidewall portion 520. Thus, the deformation resistance of the transparent cover 500 can be improved. At the same time, in the camera regulator, the camera bracket 200 includes a first bracket 210, which can drive the camera 300 to move in the circumferential direction of the fixing disc 100, thereby achieving P-direction adjustment of the camera 300. Moreover, after the camera 300 is adjusted in position, it is only necessary to position the camera brackets 200 without the need of using a magnet to lock the entire fixing disc (i.e., the mounting disc in the background art).

In a specific implementation, one of the first bracket 210 and the fixing disc 100 can be provided with first tooth slots and the other one of the first bracket and the fixing disc can be provided with first meshing teeth, and the first tooth slots are engaged with the first meshing teeth. The first bracket 210 and the fixing disc 100 are connected through the engagement between the first tooth slots and the first meshing teeth.

In the camera regulator disclosed in the embodiment of the present application, a camera 300 is mounted on a first bracket 210 and then is movable with the first bracket 210 on the fixing disc 100, thereby adjusting the position of the camera 300 on the fixing disc 100. The first bracket 210 and the fixing disc 100 are connected through the engagement between the first tooth slots and the first meshing teeth. During the adjustment, the operator can drive the first bracket 210 to move by applying a certain force. During the movement of the first bracket 210, the first tooth slots and the first meshing teeth move relative to each other. After the adjustment is completed (i.e., the external force is removed), the engagement between the first tooth slots and the first meshing teeth can ensure that the first bracket 210 is positioned at the adjusted position, and the adjustment of the camera 300 is finally completed.

Compared with the means of fixing the camera by a magnet, it is not necessary for the camera regulator disclosed in the present application to have a large magnet. As a result, the camera regulator disclosed in the present application can also solve the problem of the current imaging optical system that is heavier and more expensive due to the locking of the camera by a magnet.

In a specific implementation, the circular edge of the fixing disc 100 is partially or entirely provided with the first tooth slots 110, and correspondingly, the first bracket 210 is provided with the first meshing teeth 211a. The first bracket 210 is movable in the circumferential direction of the fixing disc 100 and thus is rotatable in the circumferential direction of the fixing disc 100. The rotation of the first bracket 210 drives the camera 300 to rotate, and thus can adjust the position of the camera 300 on the fixing disc 100. This position adjustment is performed in a disc surface parallel to the fixing disc 100, which is the P-direction adjustment of the camera 300. Of course, the first tooth slots 110 can be disposed on the first bracket 210, and correspondingly, the first meshing teeth 211a can be disposed on the fixing disc 100.

The first bracket 210 may include an elastic connection portion 211. The elastic connection portion may be provided with first meshing teeth 211a that are engaged with the first tooth slots 110. In the embodiment of the present application, the engagement between the first tooth slots and the first meshing teeth means that they are fixed to each other without any relative movement between the first tooth slots and the second meshing teeth when no external force is present. When the first tooth slots or the first meshing teeth are elastically deformed due to an external force, they are disengaged, and thus the first tooth slots and the second meshing teeth can move relative to each other. The first bracket 210 can thus move in the circumferential direction of the fixing disc 100, i.e., the first bracket 210 can rotate in the circumferential direction of the fixing disc 100.

The elasticity of the elastic connection portion 211 ensures a better flexibility in the engagement between the first tooth slots 110 and the first meshing teeth 211a. Under the action of an external force, the elastic connection portion 211 will be elastically deformed, thus the positioning between the first meshing teeth 211a and the first tooth slots 110 are disengaged, so that they can rotate relative to each other.

The rotation of the first bracket 210 in the circumferential direction of the fixing disc 100 can be implemented in various manners. The first bracket 210 may be rolled with a rolling body along the circumferential direction of the fixing disc 100 so as to rotate, and the first bracket 210 may also slide along the circumferential direction of the fixing disc 100 so as to rotate.

In a specific implementation, an annular slideway may be provided on the fixing disc 100. The first bracket 210 is in a positioning engagement with the annular slideway in a direction perpendicular to the disc surface of the fixing disc 100, and is in sliding engagement with the fixing disc 100 in the circumferential direction of the fixing disc 100. The positioning engagement of the first bracket 210 with the annular slideway in a direction perpendicular to the disc surface of the fixing disc 100 means that the first bracket 210 cannot move relative to the fixing disc 100 in a direction perpendicular to the disc surface, and can only move in the circumferential direction of the fixing disc 100 so as to rotate. Herein, the positioning engagement of the first bracket 210 with the annular slideway in the direction perpendicular to the disc surface of the fixing disc 100 means that the first bracket 210 cannot move relative to the fixing disc 100 in a direction perpendicular to the disc surface of the fixing disc 100.

The annular slideway can be formed on the fixing disc 100 in various manners. For example, the annular slideway is formed on the disc surface of the fixing disc 100. Referring again to FIG. 10, an avoidance hole 120 is provided in the center of the fixing disc 100. Specifically, the avoidance hole 120 may penetrate the fixing disc 100. The formation of the avoidance hole 120 makes the entire fixing disc 100 to be an annular structural member, along which the first bracket 210 is moved such that the first bracket 210 can rotate in the circumferential direction of the fixing disc 100.

Referring again to FIGS. 10 to 12, the first bracket 210 may include a connection base 212 and a first catch 213. The connection base 212 is attached on a side surface of the fixing disc 100, the first catch 213 is fixedly connected to the connection base 212 and passes through the avoidance hole 120 to clamp the fixing disc 100. The connection base 212 and the first catch 213 are engaged with the two side surfaces of the fixing disc 100 respectively, so that the first bracket 210 can be assembled on the fixing disc 100. During the rotation of the first bracket 210 in the circumferential direction of the fixing disc 100, the connection base 212 can slide relative to one side surface of the fixing disc 100. Similarly, the first catch 213 can slide relative to the other side surface of the fixing disc 100.

The elastic connection portion 211 may be a part of the connection base 212 or the first catch 213, or may be separate from the connection base 212 and the first catch 213.

In a specific implementation, the first bracket 210 may include a connection base 212 and an elastic connection portion 211. The elastic connection portion 211 is a first elastic arm, having one end fixed on the connection base 212 and the other end as a free end. The free end of the first elastic arm may be located outside the circular edge of the fixing disc 100. The free end of the first elastic arm can be elastically deformed relative to the connection base 212, so as to be disengaged therefrom to realize the relative rotation between the first bracket 210 and the fixing disc 100.

Figure 12:
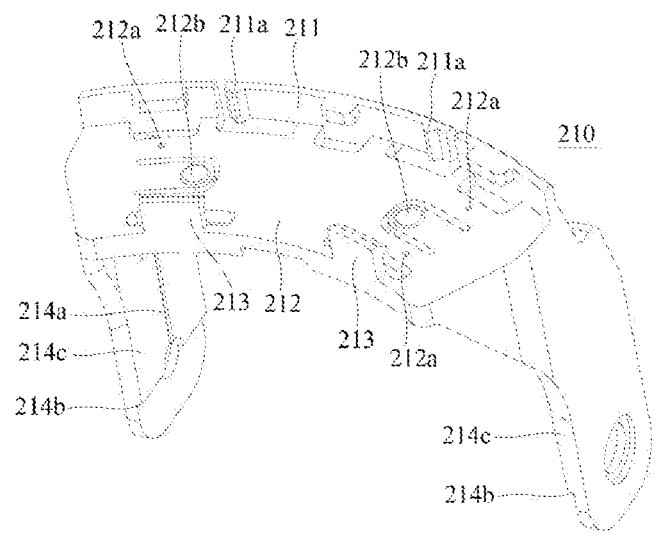
FIG. 12 is a schematic structural diagram of a first bracket according to an embodiment of the present application.

In order to ensure that the first bracket 210 does not rotate when it is not subjected to an external force or is subjected to a small interference force, in a preferred solution, at least one of the first bracket 210 and the fixing disc 100 is provided with a tightening portion that can be tightly attached to the other one of the first bracket and the fixing disc. Referring to FIG. 12, the tightening portion may include a first tightening protrusion 212a and/or a second elastic arm 212b. In a preferred solution, the first bracket 210 includes a connection base 212. The connection base is attached to the disc surface of the fixing disc 100, and has a bottom surface attached to the fixing disc 100. The bottom surface may be provided with the first tightening protrusion 212a and the second elastic arm 212b that together enable tightening attachment between the first bracket 210 and the fixing disc 100.

Referring again to FIG. 9, in the embodiment of the present application, there may be a plurality of camera brackets 200 that can be distributed along the circumferential direction of the fixing disc 100. Specifically, the plurality of camera brackets 200 may be dispersedly arranged along the circumferential direction of the fixing disc 100.

Referring to FIGS. 11, 13, 14 and 15, in the camera regulator disclosed in the embodiment of the present application, a camera bracket 200 includes a second bracket 220 disposed on the first bracket 210. The second bracket 220 is rotatably engaged with the camera 300 such that the camera can rotate around its own axis, thus adjusting the camera 300, i.e., in R-direction.

The second bracket 220 may be rotatably disposed on the first bracket 210 and be movable in a direction perpendicular to the disc surface of the fixing disc 100, thereby realizing the second bracket 220 to drive the camera 300 to rotate in pitch, and finally to realize the rotation adjustment of the camera 300 in the direction perpendicular to the fixing disc 100, i.e., the T-direction adjustment.

In order to make the adjustment more flexible, the first bracket 210 may include a support arm 214 that is rotatably engaged with the second bracket 220. The second bracket 220 includes a tightening disc 221 that can be movably engaged with the support arm 214. The tightening disc 221 includes a tightening area, wherein one of the tightening area and the support arm 214 is provided with a second tightening protrusion, and the other one is provided with a plurality of tightening grooves 221a extending in the radial direction of the tightening disc 221, and the tightening grooves 221a are engaged with the second tightening protrusion. In a specific implementation, tightening grooves 221a are provided on the tightening disc 221, and a second tightening protrusion 214a is provided on the support arm 214, and the second tightening protrusion 214a and the tightening grooves 221a can move relative to each other upon the rotation of the second bracket 220. It should be noted that the engagement between the tightening grooves 221a and the second tightening protrusion means that, when no external force is applied on the second bracket 220, the positioning of the second tightening protrusion 214a and the tightening grooves 221a ensures the camera 300 to fix in a certain position; when the second bracket 220 is subjected to an external force, the second tightening protrusion 214a and the tightening grooves 221a can be disengaged due to an elastic deformation under the action of the external force, thereby enabling them to rotate relative to each other.

In the actual application process, the camera 300 only needs to rotate relative to the second bracket 220 within a set angle range. Based on this, referring to FIGS. 10, 12, 13, 14, and 15, the support arm 214 may be provided with a first limitation portion 214b, the tightening disc 221 is provided with a second limitation portion 221b which can be engaged with the first limitation portion 214b in the rotation direction of the tightening disc 221 for positional limitation.

Figure 13:
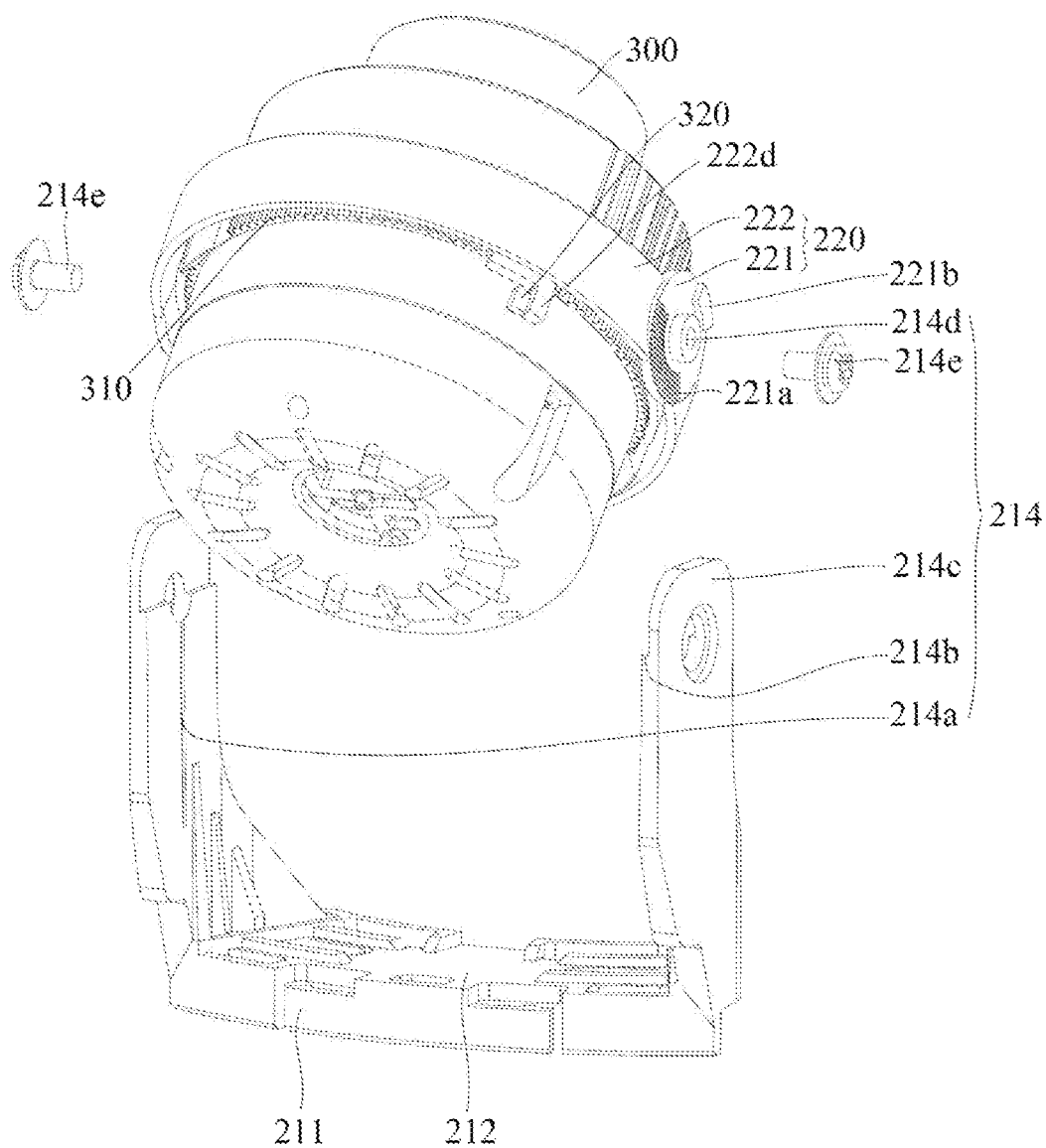
FIG. 13 is an exploded schematic diagram illustrating a partial structure of a camera bracket and a camera according to an embodiment of the present application.
Figure 14:
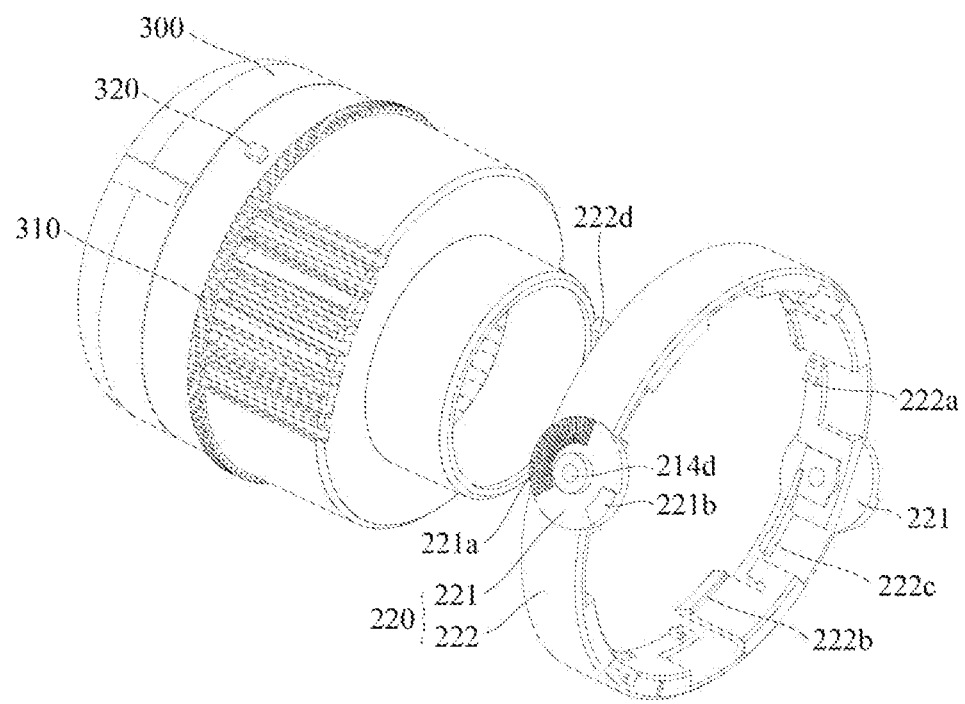
FIG. 14 is an exploded schematic diagram illustrating a partial structure of a second bracket and a camera according to an embodiment of the present application.
Figure 15:
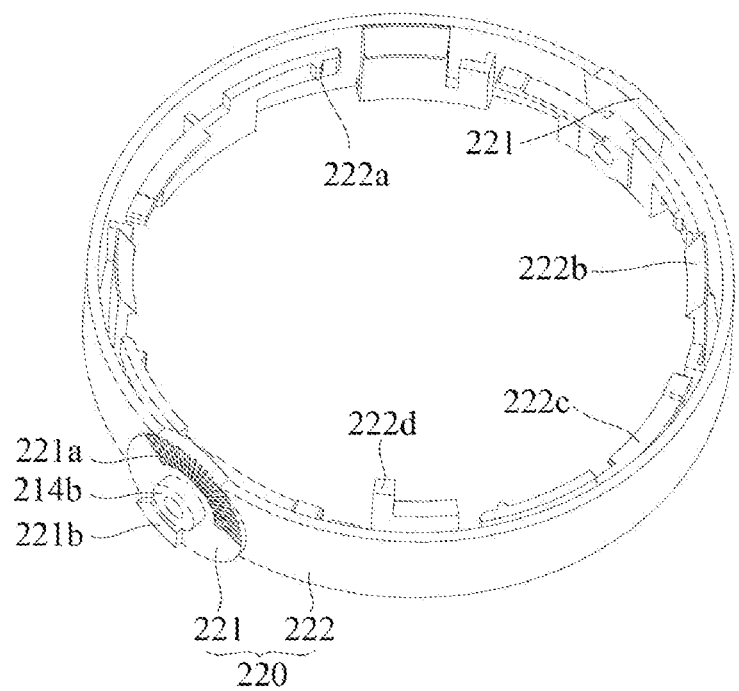
FIG. 15 is a partial structural schematic diagram of a second bracket according to an embodiment of the present application.

Referring to FIG. 13, in a specific implementation, the support arm 214 may include a support arm body 214c and a fixing block 214d fixed on the support arm body 214c. The fixing block 214d is movably engaged with the tightening disc 221 to realize the relative rotation therebetween, and the fixing block 214d and the tightening disc 221 may be fixed on the support arm body 214c by screws 214e. In the above solution, the rotation of the camera 300 relative to the support arm 214 is achieved through the rotatable engagement between the fixing block 214d and the tightening disc 221.

In order to improve the rotation stability of the camera 300, in a preferred solution, there may be two support arms 214, respectively arranged on both sides of the second bracket 220.

Referring again to FIGS. 11, 13, 14, and 15, the second bracket 220 may include an annular structural member 222 that is movably engaged with the camera 300, thereby enabling the camera 300 to rotate around its own axis. The tightening disc 221 may be provided on the annular structural member 222.

One of the annular structural member 222 and the camera 300 may be provided with second tooth slots, and the other may be provided with second meshing teeth engaged with the second tooth slots, the second meshing teeth are rotated with respect to the second tooth slots in the circumferential direction of the camera 300. Specifically, the second tooth slots 310 may be provided on the camera 300, and correspondingly, the second meshing teeth 222a may be provided in the annular structural member 222.

The inner wall of the annular structural member 222 may be provided with a second catch 222b and a boss 222c. The boss 222c is in a positioning engagement with one end of the second tooth slots 310 or the second meshing teeth 222a on the camera 300 in a set direction, so that the annular structural member 222 cannot move relative to the camera 300 in the set direction, and the second catch 222b is clamped with the other end of the second tooth slots 310 or the second meshing teeth 222a on the camera 300, thereby the positioning of the camera 300 and the annular structural member 222 in the axial direction of the latter is realized. It should be noted that the above-mentioned set direction is the axial direction of the camera 300.

Specifically, the boss 222c may be a third elastic arm perpendicular to the inner wall of the second bracket 220, and the third elastic arm is in tightening engagement with one end of the second tooth slots 310 or the second meshing teeth 222a.

In actual use, the camera 300 usually rotates around its own axis within a certain angle range without the necessity of rotating about 360° around its own axis. Based on this, referring again to FIGS. 11-13, in a preferred solution, the annular structural member 222 is provided with a third limitation portion 222d, and the camera 300 may be provided with a fourth limitation portion 320, wherein the third limitation portion 222d and the fourth limitation portions 320 are engaged in the rotation direction of the camera 300 around its own axis for positional limitation. The engagement between the third limitation portion 222d with the fourth limitation portion 320 for positional limitation enables the camera 300 to rotate within a required angle range.

The imaging optical system disclosed in the embodiment of the present application may further includes a supporting mechanism 600, one end of the supporting mechanism 600 is in supporting contact with the main casing assembly 400, and the other end is in supporting contact with the flat portion 510. The supporting mechanism 600, the curved sidewall portion 520 and the main casing assembly 400 constitute a camera accommodation space 700 where the camera 300 is located.

In the imaging optical system disclosed in the embodiments of the present application, one end of the supporting mechanism 600 is in supporting contact with the main casing assembly 400, and the other end passes through the camera regulator and is in supporting contact with the flat portion 520, thus supporting the transparent cover 500. Such structure makes the transparent cover 500 to be less deformed when subjected to an external force, thereby improving the deformation resistance of the transparent cover 500 and ultimately improving the explosion-proof performance of the imaging optical system.

There are various structures of the supporting mechanism 600. In a specific implementation, the supporting mechanism 600 may include a supporting body 610 and an elastic pad 620, one end of the supporting body 610 may be fixed on the main casing assembly 400, and the elastic pad 620 is supported between the other end of the supporting body 610 and the flat portion 510.

The supporting body 610 is a main supporting member, which is supported on the flat portion 510 by an elastic pad 620. The elastic pad 620 can ensure that the contact between the supporting mechanism 600 and the transparent cover 500 is elastic contact, avoiding the rigid contact of the transparent cover 500 with the supporting body 610 when being impacted, further reducing the probability of breakage of the transparent cover 500. As described above, the main casing assembly 400 usually includes a plurality of components, and one end of the supporting body 610 may be fixedly connected to at least one of the a plurality of components included in the main casing assembly 400, thereby fixedly connect the main casing assembly 400.

The above embodiments are merely used to illustrate the technical solutions of the present application, and are not intended to limit the same. It will be appreciated by those of ordinary skill in the art that modifications can be made to the technical solutions described in the above embodiments, or equivalent substitutions can be performed on parts of the technical features thereof. These modifications or substitutions fall within the spirit and scope of the technical solutions of the embodiments of the present application.

What is claimed is:

1. A transparent cover, comprising:
    a curved sidewall portion (520), which has an outer contour formed by a preset continuous curve rotating around a longitudinal centerline (L);
    wherein the preset continuous curve comprises a first curve segment (521) and a second curve segment (522), each having a curvature no more than a first preset value; a first back focus offset of a curved surface corresponding to the first curve segment (521) is no more than a second preset value, and a second back focus offset of a curved surface corresponding to the second curve segment (522) is no more than a third preset value;
    a first line segment (NQ) is formed by connecting an endpoint (N) of the preset continuous curve, situated outside, with a center (Q) of a circle (320) circumscribing edges of a camera lens; an included angle between the first line segment (NQ) and a boundary line (QI) of the first curve segment (521) and the second curve segment (522) is greater than 0°.

2. The transparent cover according to claim 1, wherein, a second line segment (MQ) is formed by connecting an endpoint (M) of the preset continuous curve, situated inside, with the center (Q); an included angle between the first line segment (NQ) and the second line segment (MQ) is greater than 180°, and is disposed facing toward the preset continuous curve.

3. The transparent cover according to claim 1, further comprising:
    a curved surface portion (530) enclosed at one end of the curved sidewall portion (520), wherein a longitudinal sectional curve formed by the curved surface portion (530) and the curved sidewall portion (520) is over-semicircular in shape, the length of the first curve segment (521) along the longitudinal centerline (L) is greater than the length of the second curve segment (522) along the longitudinal centerline (L), and a center of a full circle where the longitudinal sectional curve lies is disposed closely adjacent to the center (Q).

4. The transparent cover according to claim 1, further comprising:
    a flat portion (510) that is enclosed at one end of the curved sidewall portion (520) and is disposed adjacent to the first curve segment (521).

5. The transparent cover according to claim 4, wherein, the first curve segment (521) protrudes outward from an enclosed end along a direction of the longitudinal centerline (L).

6. The transparent cover according to claim 4, wherein, the preset continuous curve is over-semicircular in shape, and the transparent cover can accommodate a plurality of cameras (300) circumferentially spaced around the longitudinal centerline (L).

7. The transparent cover according to claim 1, wherein, the preset continuous curves on both sides of the longitudinal centerline (L) are symmetrical to each other, and the preset continuous curve is formed by a spline curve.

8. The transparent cover according to claim 1, wherein, a transverse sectional curve of the curved sidewall portion (520) is circular or elliptical.

9. The transparent cover according to claim 1, wherein, the first preset value is 0.1, the second preset value is 0.06, and the third preset value is 0.015.

10. An imaging optical system, comprising:
    a main casing assembly (400), a transparent cover (500), a camera (300) and a camera regulator,
    wherein, the transparent cover (500) is mounted on the main casing assembly (400), and comprises a curved sidewall portion (520) which has an outer contour formed by a preset continuous curve rotating around a longitudinal centerline (L); the preset continuous curve comprises a first curve segment (521) and a second curve segment (522), each having a curvature no more than a first preset value; a first back focus offset of a curved surface corresponding to the first curve segment (521) is no more than a second preset value, and a second back focus offset of a curved surface corresponding to the second curve segment (522) is no more than a third preset value; a first line segment (NQ) is formed by connecting an endpoint (N) of the preset continuous curve, situated outside, with a center (Q) of a circle (320) circumscribing edges of a camera lens; an included angle between the first line segment (NQ) and a boundary line (QI) of the first curve segment (521) and the second curve segment (522) is greater than 0°; the camera regulator is mounted within a space formed by the transparent cover (500) and the main casing assembly (400), and the camera is movably disposed on the camera regulator.

11. The imaging optical system according to claim 10, wherein, the camera regulator comprises a fixing disc (100) and at least two camera brackets (200), each of the at least two camera brackets (200) comprises a first bracket (210) on which a camera (300) is mounted, the camera is located within a space covered by the curved sidewall portion (520); the first bracket (210) is movably disposed on the fixing disc (100) and drives the camera (300) to move in a circumferential direction of the fixing disc (100).

12. The imaging optical system according to claim 11, wherein, one of the first bracket (210) and the fixing disc (100) is provided with first tooth slots, and the other one of the first bracket and the fixing disc is provided with first meshing teeth; the first bracket (210) and the fixing disc (100) are connected through an engagement between the first tooth slots and the first meshing teeth.

13. The imaging optical system according to claim 11, wherein, an annular slideway is provided on the fixing disc (100), the first bracket (210) is in a positioning engagement with the annular slideway in a direction perpendicular to the fixing disc (100) and is movable in the circumferential direction of the fixing disc (100).

14. The imaging optical system according to claim 10, wherein, a second line segment (MQ) is formed by connecting an endpoint (M) of the preset continuous curve, situated inside, with the center (Q); an included angle between the first line segment (NQ) and the second line segment (MQ) is greater than 180°, and is disposed facing toward the preset continuous curve.

15. The imaging optical system according to claim 10, wherein, the transparent cover (500) further comprises a curved surface portion (530) enclosed at one end of the curved sidewall portion (520), a longitudinal sectional curve formed by the curved surface portion (530) and the curved sidewall portion (520) is substantially over-semicircular in shape; the length of the first curve segment (521) along the longitudinal centerline (L) is greater than the length of the second curve segment (522) along the longitudinal centerline (L), and a center of a full circle where the longitudinal sectional curve lies is disposed closely adjacent to the center (Q).

16. The imaging optical system according to claim 10, wherein, the transparent cover (500) further comprises a flat portion (510) enclosed at one end of the curved sidewall portion (520), and the flat portion (510) is disposed adjacent to the first curve segment (521).

17. The imaging optical system according to claim 10, wherein, a distance along an optical axis of the camera (300) between the preset continuous curve and the circle (320) circumscribing edges of a camera and formed by a rotation of the camera (300) varies within a first preset range.

18. The imaging optical system according to claim 17, wherein, the first preset range is from 2 mm to 3 mm.

* * * * *